United States Patent [19]

DeLacy et al.

[11] 4,232,232

[45] Nov. 4, 1980

[54] VOLTAGE SENSING AND LOAD MEASURING AUTOMATIC RECLOSING SYSTEM FOR D-C CIRCUIT BREAKERS

[75] Inventors: James P. DeLacy, Havertown; Robert H. Lechner, Southampton, both of Pa.

[73] Assignee: Gould Inc., Rolling Meadows, Ill.

[21] Appl. No.: 5,190

[22] Filed: Jan. 22, 1979

[51] Int. Cl.³ .............................................. H02H 11/00
[52] U.S. Cl. ................................... 307/139; 362/42; 361/60; 361/63; 307/154
[58] Field of Search .................... 307/139, 140, 85, 86, 307/87, 130, 143, 154; 361/59, 60, 61, 71, 72, 73, 74, 75, 42, 65

[56] References Cited

U.S. PATENT DOCUMENTS

| 2,687,497 | 8/1954 | Schurr | 361/60 |
| 3,609,459 | 9/1971 | Thompson | 361/60 |

*Primary Examiner*—John Gonzales
*Assistant Examiner*—S. D. Schreyer
*Attorney, Agent, or Firm*—Ostrolenk Faber Gerb & Soffen

[57] ABSTRACT

A reclosing system for d-c feeder breakers in transit systems employing cars using a chopper type of regulated power is disclosed. The circuit includes voltage-sensing and load-measuring circuits which determine that there is no short circuit on the respective feeder line before the circuit breaker can be closed. The system operates in two sequential modes. The first is a voltage-sensing mode which, upon sensing a voltage on the feeder circuit greater than some given magnitude, will cause the closing of the feeder breaker. If this voltage is not sensed during the voltage-sensing mode, the circuit automatically goes into a load-measuring mode wherein a current is injected into the feeder circuit and the voltage drop caused by the injected current is monitored. If a sufficiently high voltage is produced, which indicates that the feeder circuit is free of a fault, the feeder breaker is closed.

9 Claims, 2 Drawing Figures

VOLTAGE SENSING AND LOAD MEASURING AUTOMATIC RECLOSING SYSTEM FOR D-C CIRCUIT BREAKERS

BACKGROUND OF THE INVENTION

This invention relates to a novel control system for d-c feeder breakers employed in a transit type system, and more specifically relates to a novel reclosing system which permits the closing of a d-c breaker only after determining that there is no short circuit on the feeder circuit containing the circuit breaker by alternately measuring the voltage on the feeder circuit and, if no voltage appears, the voltage drop produced by a load-measuring current injected into the feeder circuit.

There are many known applications which require the use of a d-c circuit breaker which can be closed only after it is determined that the circuit containing the circuit breaker is free of a fault. Typical of such systems is a transit system in which electrically powered vehicles traveling on energized rails draw power from one or more circuits and in which the cars themselves contain chopper type voltage regulators. The feeder circuits in these transit systems are protected by d-c breakers which must not be permitted to close if there is a fault on the feeder circuit. Such systems have used control circuits which measure the feeder circuit voltage before permitting closure of the breaker. Thus, if feeder circuit voltage exists, it is indicative that the feeder circuit is free of fault and the d-c feeder breaker can be closed.

In many transit systems, such as a radial type of electrical system or in a network system having an open substation breaker at the remote end of the line, it is possible that a feeder breaker is open and the feeder circuit will not have any voltage thereacross even though the circuit is free of a fault. In this situation, it is known that a current can be caused to flow in the feeder circuit and the circuit resistance can be measured to determine whether or not a fault exists. If no fault is found, then the feeder breaker can be closed.

The prior art control circuits have been subject to numerous disadvantages. Among these disadvantages are:

(a) They require a large number of components.
(b) The individual components are complex and difficult to calibrate.
(c) The systems had relatively large space requirements and were relatively expensive.
(d) The systems have been susceptible to allowing incorrect closing of the feeder breaker due to negative track voltage resulting from cross-bonded running rails.
(e) The systems have not been useful in relatively high voltage systems up to about 1000 volts d-c.

BRIEF DESCRIPTION OF THE PRESENT INVENTION

The present invention provides a novel integrated control system which automatically sequentially switches from a voltage-sensing mode to a load-measuring mode of operation. Thus, if there is sufficient feeder voltage from a remote source, the voltage-sensing mode of operation allows closure or automatic reclosure of the feeder breaker. However, if there is no remote source of feeder voltage, the load-measuring mode will automatically come into play to determine whether the feeder is free of fault and, if so, permits breaker closing.

The load-measuring mode is carried out by measuring the track voltage produced due to a "search" current which is transmitted during the load-measuring mode. If the resulting voltage is sufficiently high, it is determined that no fault exists on the feeder circuit and the feeder breaker is closed. If the voltage drop produced by the injected current is below some given value, the breaker is not closed, but the system again repeats the cycle. After a given number of measurements, all indicating a faulted system, the system is locked out until an external initiation signal is received.

The novel system of the invention integrates the various components in a novel way so that fewer components are needed than in presently existing systems. The system is also easily calibrated. The system having less components now has less space requirement and has a lower cost of installation due to the fewer components and reduced wiring. Moreover, the novel circuitry which is used is not susceptible to incorrect closing of the feeder breaker due to negative track voltage caused by cross-bonded running rails. The system is also capable of operation in 1000 volt d-c transit systems.

DESCRIPTION OF THE PREFERRED EMBODIMENTS

Figure 1:
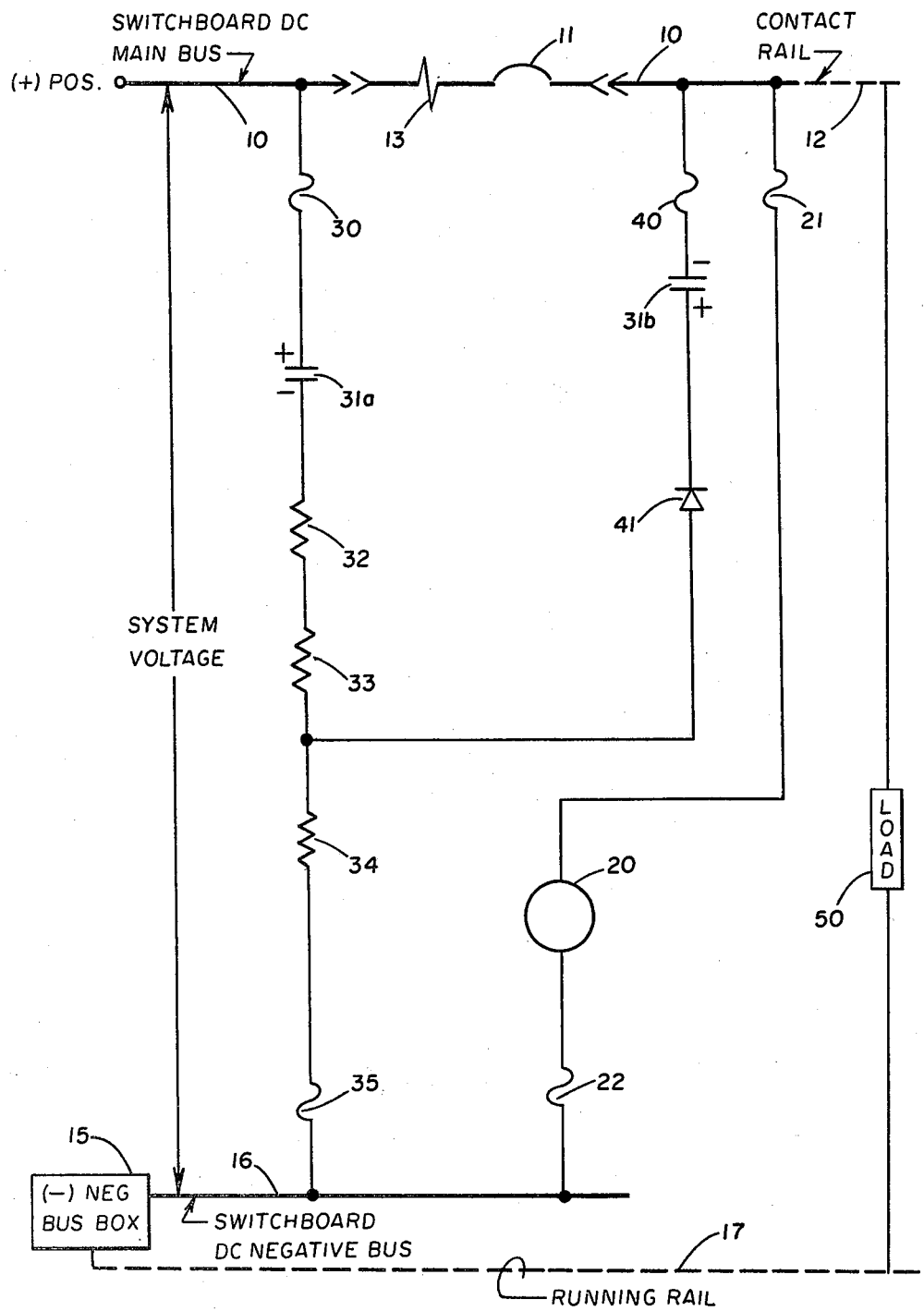
FIG. 1 is a circuit diagram of the power system circuitry used in accordance with the present invention.

Referring first to FIG. 1, there is shown the power system circuit which includes a positive switchboard d-c main bus 10 which is connected to d-c feeder circuit breaker 11 and to a contact rail 12 of a transit system. Note that the invention can be applied to systems other than traction systems, although the invention is disclosed herein in connection with a traction system. Circuit breaker 11 has an overcurrent trip device 13 associated therewith. The overcurrent device 13 is an integral part of the circuit breaker 11 and can be any fault-sensing element which will trip the circuit breaker whenever the current exceeds some predetermined value. Typically, circuit breaker 11 can be a Gould/I-T-E D-C air circuit breaker type FBK, rated at 1000 volts having a current rating suitable for the particular application.

A negative bus box 15 is provided and is connected to a switchboard d-c negative bus 16 which is suitably insulated from ground and a running rail 17 extends from the negative bus box 15. The system voltage is then applied between the positive bus 10 and negative bus 16.

An under-and-overvoltage relay 20 is then connected across bus bars 10 and 16. Relay 20 may be an English Electric type DBB4 and has auxiliary coils 20L and 20H (FIG. 2) which have associated contacts, shown in FIG. 2 as contacts 20L$a$, 20L$b$ each associated with coil 20L and the contact 20H$a$ associated with coil 20H.

As will be described later, the under-and-overvoltage relay 20 operates such that whenever less than 200 volts is applied across the main coil 20 in FIG. 1, the auxiliary coil 20L picks up and its associated contacts, shown in FIG. 2, change from the positions shown. Whenever a voltage of between 200 and 400 volts is applied across the coil 20 in FIG. 1, neither auxiliary coil 20L nor 20H picks up. However, if more than 400 volts appears across the coil 20, then the auxiliary coil 20H picks up and its associated contact changes position.

Coil 20 in FIG. 1 is protected by suitable fuses 21 and 22 which may each be current-limiting fuses rated at 10 amperes and 1200 volts. The power circuit of FIG. 1 also contains a circuit containing the series-connection of fuse 30, relay contact 31a which is associated with relay coil 31 in FIG. 2, resistor 32, resistor 33, resistor 34 and fuse 35. Fuses 30 and 35 in the above circuit may each be current-limiting fuses rated at 20 amperes and 1200 volts. Resistors 32 and 33 may be 53 ohm, 755 watt resistors while resistor 34 may be a 76 ohm, 755 watt resistor.

Figure 2:
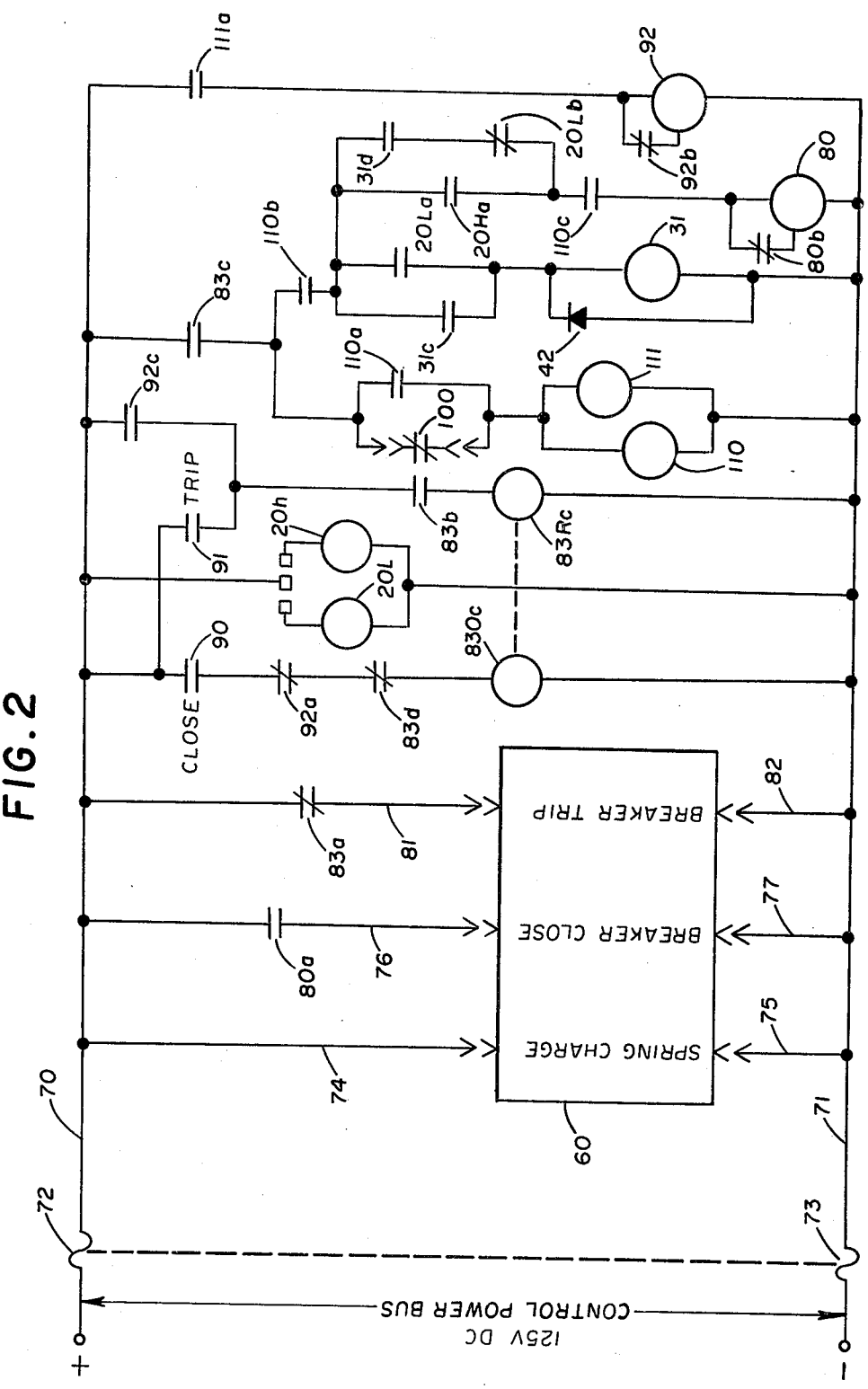
FIG. 2 is a circuit diagram of the control circuit which is used in accordance with the invention and with the power circuitry of FIG. 1.

A further circuit is provided in FIG. 1 consisting of fuse 40, a second contact 31b of relay coil 31 of FIG. 2 and a diode 41 having its anode connected to the junction between resistors 33 and 34. The relay 31 has further contacts shown in FIG. 2 as contacts 31c and 31d. Relay 31 may be a Vapor Corporation contactor, part number 36440001-06. A diode 42 is connected in parallel with the coil 31 as shown in FIG. 2. Diodes 41 and 42 may be devices respectively rated at 3000 volts and 16 amperes d-c and 1000 volts and 3 amperes d-c, respectively.

In the power circuit of FIG. 1, a load 50 is schematically illustrated as being connected across contact rail 12 and running rail 17. Load 50 is an electric train arrangement using a chopper type electrical control system and may consist of one or more electric cars.

The circuit breaker 11 has controls which are schematically illustrated in FIG. 2 by the block 60. These controls, as well as the remainder of the control circuit, are energized from a control power bus system including the positive bus 70 and negative bus 71 which may, for example, provide 125 volts d-c control power. Two protective fuses 72 and 73 are provied to protect the control power bus. Each of fuses 72 and 73 can be 30 ampere, 250 volt fuses.

The control 60 for circuit breaker 11 has a first pair of inputs connected across control power buses 70 and 71 which energize the conventional spring-charge mechanism of the circuit breaker. These inputs are connected to leads 74 and 75. A second pair of leads 76 and 77 are connected from the control power source to the breaker-close mechanism which can be of any desired type and is operable to cause the breaker to close when these lines are energized.

Lead 76 contains a relay contact 80a which is associated with relay coil 80. Relay coil 80 may be a Gould/I-T-E type J13 auxiliary relay and contains relay contact 80b.

A further pair of leads 81 and 82 from the control power bus are then connected to a breaker trip mechanism of control 60 which is operable to cause the breaker 11 to open when this line is energized. Lead 81 contains control contact 83a which is a contact of the latch type two-position relay 83OC and 83RC. The latch type two-position relay 83OC-83RC may be a Westinghouse Electric type MG-6 latch type two-position relay. This relay is also associated with contacts 83b, 83c and 83d which will be later described.

The next circuit extending across the control power bus 70-71 in FIG. 2 is a circuit including the circuit breaker close contact 90 which is also associated with a circuit breaker trip contact 91. Contacts 90 and 91 are the contacts of a control switch having close and trip operation with spring-return to normal. Thus, the device can be a Gould/I-T-E C77 control switch. Contact 92a of relay coil 92 is connected in series with close contact 90. Relay 92 also has contact 92b and a contact 92c associated therewith. Relay coil 92 may be of identical construction to the relay 80 and may be a Gould/I-T-E type J13 auxiliary relay. Contact 92a is next connected in series with contact 83d.

Relay contact 83c is connected to several branch circuits. The first of these branch circuits includes the conventional circuit breaker contact 100 which is a so-called b contact which is operated with the main contacts of circuit breaker 11 such that contact 100 is closed when the circuit breaker 11 is opened and is opened when the circuit breaker 11 is closed. Contact 100 is then connected in series with a timer relay coil 110 which is operable to close its associated contacts 110a, 110b and 110c in a predetermined sequence. More specifically, timer relay 110 may be an Eagle Timer type MP, part number MP4-DC-01-MP5-60. This relay essentially consists of a motor 110 which drives the contacts 110a, 110b and 110c as follows: contact 110a closes after 2 seconds and opens after 15 seconds, contact 110b closes after 7 seconds and opens after 10 seconds, contact 110c closes after 8.75 seconds and opens after 11 seconds.

A time-delay relay 111 is connected in parallel with the motor of relay 110 and may be an Agastat time delay on pick-up relay, type 7000. This relay is set to pick up at 75 seconds. Relay contact 111a connected in series with relay coil 92 is operated by relay coil 111.

It is now possible to describe the operation of the novel circuit. Before describing the circuit operation, however, the initial assumptions are made:

(a) It is assumed that the traction station d-c power bus is energized.

(b) The train resistance per deenergized car is assumed to be approximately 5000 ohms or higher for load-measuring resistors 32, 33 and 34 and described earlier.

(c) It is presumed that the feeder circuit breaker 11 is open.

(d) It is presumed that the feeder under-and-overvoltage relay 20 calibration is such that the device 20L becomes energized through the main contact of the device when the feeder voltage is 200 volts or less. It is next assumed that the device 20H becomes energized through the main contacts of the device when the feeder voltage is above 400 volts.

(e) It is next assumed that all of the contacts are in the position shown in the drawing with a line through the contact indicating a normally closed contact while the absence of the line indicates a normally open contact.

Before considering the detailed operation of the individual relays and contacts, it is useful first to consider a general over-view of the circuit operation. Thus, in order to close the breaker, the breaker control switch 90 is turned to the close position in order to activate the d-c breaker automatic reclosing system. Within 10 seconds after the closing of switch 90, the novel circuit of the invention will have established the integrity of the feeder circuit and will operate to either allow or prevent the closing of the circuit breaker 11. The particular mode of operation which is employed—either automatic voltage sensing or automatic load measuring—is determined by the existence of a feeder voltage or the lack of a feeder voltage as interpreted by the over-and-undervoltage relay 20. Thus, for feeder voltages above 400 volts, the breaker will be closed via the voltage-sensing mode.

For feeder voltages which are equal to or less than 200 volts (and assuming there is no fault on the feeder), the breaker 11 will be closed via the load-measuring mode. More specifically, if the feeder circuit is energized from its remote end and the voltage on the feeder circuit is above 400 volts, the device 20 will interpret this voltage level as a non-faulted feeder and will therefore initiate the sending of a close signal to the breaker 11. The breaker will close and the automatic reclosing system will continue to step through its functions to a reset condition.

If, however, in looking at the feeder circuit voltage, it is found that the feeder is energized from its remote end and the voltage is equal to or below 400 volts but above 200 volts, the device 20 will interpret this voltage level as a null point and prevent breaker closing and will recycle the system through all of its steps and then automatically make a continued cycle or take another "look" at the feeder and again attempt a reclosing operation.

If the feeder voltage is found to be 200 volts or below, this indicates the presence of a voltage which may be the result of a connection (either high or low resistance connection) between the positive-to-negative rails and due to current in the cross-bonded negative rails. The device 20 will then reinterpret this voltage level (or lack of it) as a need to switch to the load-measuring mode to establish the feeder's integrity. Thus, the load-measuring mode is only employed when feeder voltage is 200 volts or below.

In the load-measuring mode, a search current is injected into the feeder circuit and, based on the resistance in the feeder circuit, it will produce a voltage across the relay 20 in FIG. 1. If the feeder load resistance produces a resulting voltage which is above 200 volts during the transmission of the search current, the device 20 will interpret this voltage level as a non-faulted feeder and permit the production of a close signal for the breaker 11. The circuit will then continue through all of its stages to return to a reset condition. If, however, the feeder load resistance produces a resulting voltage which is 200 volts or below during the transmission of the search current, the device 20 relay will interpret this voltage level as a faulted feeder and prevent the closing of breaker 11. With this determination, the load-measuring mode ends and the automatic reclosing system will automatically recycle for another look at the feeder and make another reclosing attempt.

After a total of 5 continuous but unsuccessful attempts at reclosing, the automatic reclosing system is locked out.

The following is a detailed description of the operation of the circuits shown in FIGS. 1 and 2.

It is first assumed that the initial assumptions given previously are in force and one wishes to reclose or close the breaker 11 on the feeder circuit. The breaker control switch 90 is first closed so that the operating coil 83OC of the latch relay 83 is energized and will pick up and latch in. Consequently, contact 83d, which is associated with the relay coil 83OC, opens to deenergize the latch-in operating coil 83OC. However, contact 83b closes in the deenergized control circuit of the reset coil 83RC. The relay coil 83OC then causes contact 83a, associated with the breaker trip circuit, to open, thereby removing a trip input to the breaker 11. Finally, the contact 83c, which is associated with breaker contact 100, closes to initiate the automatic reclosing system by permitting energization of the timing relay 110 and the incomplete sequence timing relay 111.

Two seconds after the energization of timing relay 110, the timer contact 110a closes to seal in across the breaker contact 100 both devices 110 and 111. Both of these relays 110 and 111 continue to time but no further contact operations occur for a short period of time. This "dead" time allows for stabilization of post-fault feeder conditions.

After 7 seconds, the timer contact 110b, which is in series with device 31, closes to initiate the voltage-sensing and load-measuring modes of the automatic closing system. Which mode is to be employed will be determined by the operation of the under-and-overvoltage relay 20. For example and considering the voltage-sensing mode, if the feeder is energized from its remote end and the voltage is above 400 volts, the main contacts shown in FIG. 2 above the relay coils 20L–20H are closed to the 20H side and the internal auxiliary device 20H is energized. With coil 20H energized, contact 20Ha in series with contact 110b is closed. Thus, when contact 110c closes at 8.75 seconds, relay coil 80 is energized and thereby closes its main contact 80a which is connected to the breaker-close mechanism. Thus, a closing signal is delivered to the circuit breaker 11.

The timing device 110 continues to run, however, and its contacts 110b, 110c and 110a open at 10 seconds, 11 seconds and 15 seconds, respectively. Since the breaker 11 has closed, the breaker contact 100 has opened and devices 110 and 111 are both deenergized. The automatic reclosing system is now reset and no further operation occurs until some external input is applied to the circuit.

In the event that the voltage applied to the relay 20 of FIG. 1 is equal to or less than 400 volts but above 200 volts, it is not desired to permit the closing of the breaker. Thus, in this voltage range, the main contacts of relay coils 20L and 20H do not move either to the low voltage coil or the high voltage coil but both coils remain unenergized. Thus, the relay 20 interprets this voltage range as a null region and neither of the devices 20L or 20H can be energized. Thus, the breaker 11 is prevented from closing (neither contact 20La nor 20Ha is closed) and the system simply recycles through all of its steps and then automatically makes a continued cycle or takes another "look" at the feeder and again attempts a reclosing operation. Note that after five attempts to reclose, the rely contact 111a will close to energize relay coil 92 and in turn open contact 92a. Contact 92a is in the circuit in series with coil 83OC. Contact 92c closes to energize coil 83RC. The energization of coil 83RC unlatches the relay so that its contact 83d closes in the deenergized operating coil 83OC circuit. At the same time, contact 83b opens in the deenergized reset coil circuit of coil 83RC and contact 83a closes in order to restore the trip input to the breaker control 60 of circuit breaker 11. Finally, contat 83c opens to deenergize the automatic reclosing system. This deenergizes relay 111 which, in turn, deenergizes relay 92 by opening contact 111a.

The automatic reclosing system is then completely locked out and only a breaker control switch close signal by closing contact 90 will again initiate the system.

The load-measuring mode is employed only when the feeder voltage is 200 volts or below as measured by the coil 20 in FIG. 1. This mode begins with the energization of coil 31 due to the closing of contact 20La which is, in turn, caused by the closing of the main contacts of device 20 to energize the coil 20L. The energization of coil 31 causes the closing of contacts 31a and 31b in FIG. 1 which connects resistors 32, 33 and 34 across the d-c bus 10–16 and, in effect, connects resistors 32 and 33 across the open circuit breaker 11. A current, which is hereinafter termed a "search" current, is then injected into the feeder circuit and the search current magnitude will be a function of the feeder circuit load resistance. The feeder circuit load resistance and the injected current will then determine the voltage which is applied across relay coil 20 in FIG. 1. This voltage can vary from about 375 volts (which would appear if there is 900 volts on the station bus and no load on the feeder) to a low of 0 volts if there is a short circuit on the feeder.

The device 20 is specifically calibrated to allow breaker reclosing only if the resulting feeder voltage across the coil 20 is above 200 volts after the closing of contacts 31a and 31b in FIG. 1. This precludes the danger that a negative rail voltage could appear due to the cross-bonded track and a short-circuited third rail which could permit the false closing of the open feeder breaker 11. By requiring the appearance of more than 200 volts across the coil 20, the voltage necessary will be in excess of the anticipated maximum negative track voltage which could be caused by a train on the cross-bonded track which is accelerating and thus assures that the breaker will not close onto a faulted feeder.

The detailed operation of the load measuring mode is as follows:

If the feeder's load resistance produces a resulting voltage above 200 volts during the transmission of the search current, the main contact of device 20 is open between its high voltage and low voltage side in FIG. 2 so that neither coil 20L nor 20H is energized. Since the coil 20L is deenergized, its contact 20Lb is closed and with the now-closed contact 31d and timer contact 110c allows energization of relay coil 80. The relay coil 80 then causes the closing of relay contact 80a and sends a closing signal to the breaker 11. At the same time, relay contact 20La opens. However, relay coil 31 does not become deenergized because it is sealed in by its own contact 31c. Since the device 20H remains deenergized, its contact 20Ha remains open and prevents device 20H from energizing relay coil 80.

The above contact operation of devices 20L and 20H results in closing the feeder breaker 11. During this time, the timing device 110 continues to run and its contacts 110b, 110c and 110a open at 10 seconds, 11 seconds and 15 seconds, respectively. Since the breaker contact 100 opens when the circuit breaker 11 closes, devices 110 and 111 are both deenergized. The automatic reclosing system is now reset and no further operation occurs until some external input is received.

If, during the load-measuring mode, the feeder load resistance produces a resulting voltage of 200 volts or less across coil 20, this would signify a short-circuit condition in the feeder and the breaker 11 should not be closed. Under this condition, the main contact of device 20 will close to energize coil 20L while coil 20H will remain deenergized. With the energization of coil 20L, its contact 20Lb is opened to prevent the energization of coil 80 and a subsequent breaker closing signal. At the same time, contact 20La is closed to continue to energize device 31. Since the device 20H remains deenergized, its contact 20Ha remains open and prevents the device 20H (voltage-sensing mode) from energizing the device 80.

Consequently and from the foregoing, coil 20L is energized and coil 20H is left deenergized to prevent the closing of the feeder breaker 11 when the load-measuring voltage of 200 volts or below is applied across the coil 20 to be interpreted as a faulted feeder condition. In addition, the automatic reclosing system will recycle for a second look at the feeder circuit.

Should the fault condition persist, the automatic reclosing cycle will be repeated four additional times. If, at the end of this time (75 seconds), the abnormal resulting voltage still prevails, device 111 closes its contact 111a, energizing device 92. Device 92 will then cause the opening of contact 92a in the circuit in series with coil 83OC and closes contact 92c to energize coil 83RC. The energization of coil 83RC unlatches the relay so that its contact 83d closes in the deenergized operating coil 83OC circuit. At the same time, contact 83b opens in the deenergized reset coil circuit of coil 83RC and contact 83a closes in order to restore the trip input to the breaker control 60 of circuit breaker 11. Finally, contact 83c opens to deenergize the automatic reclosing system. This deenergizes relay 111 which, in turn, deenergizes relay 92 by opening contact 111a.

The automatic reclosing system is then completely locked out and only a breaker control switch close signal by closing contact 90 will again initiate the system.

During normal operation of a d-c transit system, the feeder breaker voltage-sensing and load-measuring automatic reclosing circuit will be initiated via the closing of circuit breaker contact 100 when the breaker trips to remove a fault.

Note that the contact 91 which is a trip contact in series with contacts 83b and coil 83RC can be manually operated in order to trip the breaker without initiating automatic reclosing.

The present invention has numerous advantages over presently existing systems. Thus, fewer components are used and the system is easily calibrated. The use of few components leads to smaller space requirements, reduced wiring and installation cost and permits installation of the majority of the components on sub panels before installation in an instrument compartment. Moreover, the novel system of the invention is not susceptible to permitting incorrect closing of the feeder breaker 11 if there is a negative track voltage resulting from cross-bonded running rails.

Although the present invention has been described in connection with a preferred embodiment thereof, many variations and modifications will now become apparent to those skiilled in the art. It is preferred, therefore, that the present invention be limited not by the specific disclosure herein, but only by the appended claims.

What is claimed is:

1. The process of monitoring the condition of a feeder circuit and operating a d-c feeder breaker in the feeder circuit comprising the steps of:
   monitoring the voltage in a voltage-measuring mode across said feeder circuit and closing said breaker if the feeder voltage is above a first value, or initiating a load-measuring mode if said feeder voltage is lower than a second value that is lower than said first value;
   when in said load-measuring mode, injecting a current into said feeder circuit and measuring the voltage drop across said feeder circuit in response to the injected current;

maintaining said feeder breaker open when the voltage measured during said load-measuring mode is below a given value;

and closing said feeder breaker when said voltage measured during said load-measuring mode is above said given value.

2. The process of claim 1 which includes the further step of reinitiating said voltage-sensing and load-measuring modes a given number of times when the voltage measured during the load-measuring mode is below said given value and thereafter stopping said process.

3. The process of claim 1 wherein said feeder circuit is in a transit system employing cars which are regulated by chopper type regulators.

4. The process of claim 2 wherein said feeder circuit is in a transit system employing cars which are regulated by chopper type regulators.

5. The process of claim 1 wherein, if said feeder voltage is in a voltage range between said first and second values, said feeder breaker is not closed and said voltage-measuring and load-measuring modes are reinitiated.

6. The process of claim 2 wherein, if said feeder voltage is in a voltage range between said first and second values, said feeder breaker is not closed and said voltage-measuring and load-measuring modes are reinitiated.

7. The process of claim 6 wherein said feeder circuit is in a transit system employing cars which are regulated by chopper type regulators.

8. The process of claim 1, 2, 5 or 6 wherein said given value is equal to said second value.

9. The process of claim 8 wherein said first value is about 400 volts and said second value is about 200 volts.

* * * * *